(12) United States Patent
Jung et al.

(10) Patent No.: US 9,423,593 B2
(45) Date of Patent: Aug. 23, 2016

(54) OPTICAL SYSTEM

(71) Applicant: SAMSUNG ELECTRO-MECHANICS CO., LTD., Suwon-Si (KR)

(72) Inventors: Phil Ho Jung, Suwon-Si (KR); Yong Joo Jo, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/249,220

(22) Filed: Apr. 9, 2014

(65) Prior Publication Data

US 2015/0205069 A1 Jul. 23, 2015

(30) Foreign Application Priority Data

Jan. 23, 2014 (KR) .................. 10-2014-0008240

(51) Int. Cl.
*G02B 9/60* (2006.01)
*G02B 13/18* (2006.01)
*G02B 13/04* (2006.01)
*G02B 13/00* (2006.01)

(52) U.S. Cl.
CPC .............. *G02B 13/0045* (2013.01); *G02B 9/60* (2013.01)

(58) Field of Classification Search
CPC .............................. G02B 9/60; G02B 13/0045
USPC ........................................ 359/714, 770, 753
See application file for complete search history.

(56) References Cited

U.S. PATENT DOCUMENTS

| 4,018,511 A * | 4/1977 | Takahashi |
| 4,143,945 A * | 3/1979 | Kubota |
| 2007/0236811 A1 | 10/2007 | Mori |
| 2011/0157725 A1* | 6/2011 | Baba ............... G02B 13/0045 359/740 |
| 2015/0103225 A1* | 4/2015 | Hsu .................. G02B 13/0045 348/335 |

FOREIGN PATENT DOCUMENTS

| JP | 2010-8562 A | 1/2010 |
| JP | 2010-26434 | 2/2010 |
| KR | 10-2013-0055137 A | 5/2013 |

OTHER PUBLICATIONS

Office Action dated Nov. 27, 2014 for Korean Patent Application No. 10-2014-0008240 and its English summary provided by Applicant's foreign counsel.

* cited by examiner

*Primary Examiner* — William Choi
(74) *Attorney, Agent, or Firm* — NSIP Law

(57) ABSTRACT

There is provided a first lens having a refractive power, an object-side surface thereof being convex toward an object; a second lens having positive refractive power; a third lens having negative refractive power; a fourth lens having positive refractive power; and a fifth lens having negative refractive power. The optical system satisfies the condition:

$T34/T23 > 8.0$ where T23 is a distance between the second and third lenses, and T34 is a distance between the third and fourth lenses.

28 Claims, 8 Drawing Sheets

OPTICAL SYSTEM

CROSS-REFERENCE TO RELATED APPLICATION

This application claims the benefit of Korean Patent Application No. 10-2014-0008240 filed on Jan. 23, 2014, with the Korean Intellectual Property Office, the disclosure of which is incorporated in its entirety herein by reference.

BACKGROUND

The present disclosure relates to an optical system.

Recent mobile communications terminals have been provided with camera modules to enable images to be captured and video calls to be made. In addition, as the functionality camera modules provided in mobile communications terminals has gradually increased, cameras for mobile communications terminals have gradually been required to have high degrees of resolution and high levels of performance.

However, since there a trend for mobile communications terminals to be miniaturized and lightened exists, there are limitations on implementing camera modules having high degrees of resolution and high levels of performance.

In order to solve these problems, recently, lenses provided in camera modules have has been formed of plastic, a material lighter than glass, and lens modules have been configured using five or more lenses in order to implement high degrees of resolution.

However, in the case of lenses formed of plastic, the improvement of chromatic aberrations and the implementation of relatively bright optical systems have been problematic, when compared to than lenses formed of glass.

SUMMARY

An aspect of the present disclosure may provide an optical system allowing for improvements in an aberration improvement effect and allowing for the implementation of high degrees of resolution.

According to an aspect of the present disclosure, an optical system may include: a first lens having refractive power, an object-side surface thereof being convex toward an object; a second lens having positive refractive power; a third lens having negative refractive power; a fourth lens having positive refractive power; and a fifth lens having negative refractive power, wherein the optical system satisfies Conditional Expression 1:

$T34/T23 > 8.0$ [Conditional Expression 1]

where T23 is a distance (air gap) [mm] between the second and third lenses, and T34 is a distance (air gap) [mm] between the third and fourth lenses.

The optical system may satisfy Conditional Expression 2:

$f1/f < -1.0$ [Conditional Expression 2]

where f1 is a focal length [mm] of the first lens, and f is an overall focal length [mm] of the optical system.

The optical system may satisfy Conditional Expression 3:

$f12/f < 1.0$ [Conditional Expression 3]

where f12 is a synthetic focal length [mm] of the first and second lenses, and f is an overall focal length [mm] of the optical system.

The optical system may satisfy Conditional Expression 4:

$20 < v2 - v3 < 70$ [Conditional Expression 4]

where v2 is an Abbe number of the second lens, and v3 is an Abbe number of the third lens.

The optical system may satisfy Conditional Expression 5:

$-3.0 < f3/f2 < -0.3$ [Conditional Expression 5]

where f2 is a focal length [mm] of the second lens, and f3 is a focal length [mm] of the third lens.

The optical system may satisfy Conditional Expression 6:

$0.5 < OAL/f < 2.0$ [Conditional Expression 6]

where OAL is a distance [mm] from an object-side surface of the first lens to an image surface, and f is an overall focal length [mm] of the optical system.

The optical system may satisfy Conditional Expression 7:

$v3 < 40$ [Conditional Expression 7]

where v3 is an Abbe number of the third lens.

The optical system may satisfy Conditional Expression 8:

$-5.0 < f4/f1 < 0$ [Conditional Expression 8]

where f1 is a focal length [mm] of the first lens, and f2 is a focal length [mm] of the fourth lens.

The optical system may satisfy Conditional Expression 9:

$1.60 < n3 < 2.10$ [Conditional Expression 9]

where n3 is a refractive index of the third lens.

The first lens may have negative refractive power.

The object-side surface of the first lens may be convex toward the object.

The first lens may have a meniscus shape in which it is convex toward the object.

An object-side surface of the second lens may be convex toward the object.

Both surfaces of the second lens may be convex.

The second lens may have a meniscus shape in which it is convex toward the object.

An image-side surface of the third lens may be concave toward an image.

Both surfaces of the third lens may be concave.

The third lens may have a meniscus shape in which it is convex toward the object.

The fourth lens may have a meniscus shape in which it is convex toward an image.

Both surfaces of the fifth lens may be concave.

The fifth lens may have an inflection point formed on an object-side surface or an image-side surface thereof.

The fifth lens may have at least one inflection point formed on an image-side surface thereof.

The first to fifth lenses may be formed of plastic.

At least one of an object-side surface and an image-side surface of each of the first to fifth lenses may be aspherical.

According to another aspect of the present disclosure, an optical system may include: a first lens having negative refractive power, an object-side surface thereof being convex toward an object; a second lens having positive refractive power; a third lens having negative refractive power; a fourth lens having positive refractive power; and a fifth lens having negative refractive power, wherein the first and second lenses overall have positive refractive power, and the optical system satisfies Conditional Expression 1:

$T34/T23 > 8.0$ [Conditional Expression 1]

where T23 is a distance (air gap) [mm] between the second and third lenses, and T34 is a distance (air gap) [mm] between the third and fourth lenses.

The optical system may satisfy Conditional Expression 2:

$f1/f < -1.0$ [Conditional Expression 2]

where f1 is a focal length [mm] of the first lens, and f is an overall focal length [mm] of the optical system.

The optical system may satisfy Conditional Expression 3:

$f12/f<1.0$  [Conditional Expression 3]

where f12 is a synthetic focal length [mm] of the first and second lenses, and f is an overall focal length [mm] of the optical system.

The optical system may satisfy Conditional Expression 4:

$20<v2-v3<70$  [Conditional Expression 4]

where v2 is an Abbe number of the second lens, and v3 is an Abbe number of the third lens.

The optical system may satisfy Conditional Expression 5:

$-3.0<f3/f2<-0.3$  [Conditional Expression 5]

where f2 is a focal length [mm] of the second lens, and f3 is a focal length [mm] of the third lens.

The optical system may satisfy Conditional Expression 6:

$0.5<OAL/f<2.0$  [Conditional Expression 6]

where OAL is a distance [mm] from an object-side surface of the first lens to an image surface, and f is an overall focal length [mm] of the optical system.

The optical system may satisfy Conditional Expression 7:

$v3<40$  [Conditional Expression 7]

where v3 is an Abbe number of the third lens.

The optical system may satisfy Conditional Expression 8:

$-5.0<f4/f1<0$  [Conditional Expression 8]

where f1 is a focal length [mm] of the first lens, and f4 is a focal length [mm] of the fourth lens.

The optical system may satisfy Conditional Expression 9:

$1.60<n3<2.10$  [Conditional Expression 9]

where n3 is a refractive index of the third lens.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the following lens configuration diagrams, thicknesses, sizes, and shapes of lenses have been slightly exaggerated for explanation. Particularly, a shape of a spherical surface or an aspherical surface shown in the lens configuration diagrams has been shown only by way of example. That is, the spherical surface or the aspherical surface is not limited to having the shown shape.

In addition, it is to be noted that a first lens refers to a lens that is the closest to an object, and a sixth lens refers to a lens that is the closest to an image.

Further, it is noted to be that the term 'front' refers to a direction from the optical system toward the object, while the term 'rear' refers to a direction from the optical system toward an image sensor or the image. Further, it is to be noted that in each lens, a first surface refers to a surface toward the object (or an object-side surface) and a second surface refers to a surface toward the image (or an image-side surface). In addition, it is to be noted that the present specification, units of all of numerical values of radii of curvature, thicknesses, OALs, BFLs, and D1 of lenses are mm.

An optical system according to an exemplary embodiment of the present disclosure may include five lenses.

That is, the optical system according to an exemplary embodiment of the present disclosure may include a first lens 10, a second lens 20, a third lens 30, a fourth lens 40, and a fifth lens 50.

However, the optical system according to an exemplary embodiment of the present disclosure is not limited to including only five lenses, but may further include other components if necessary. For example, the optical system may include a stop ST for controlling an amount of light. In addition, the optical system may further include an infrared cut-off filter 60 cutting off an infrared ray. Further, the optical system may further include an image sensor 70 for converting an image of a subject incident into an electrical signal. Further, the optical system may further include an interval maintaining member adjusting an interval between lenses.

The first to fifth lenses 10 to 50 configuring the optical system according to an exemplary embodiment of the present disclosure may be formed of plastic.

In addition, at least one of the first to fifth lenses 10 to 50 may have an aspherical surface. In addition, the first to fifth lenses 10 to 50 may have at least one aspherical surface.

That is, at least one of first and second surfaces of the first to fifth lenses 10 to 50 may be aspherical.

In addition, the optical system including the first to fifth lenses 10 to 50 may have negative refractive power/positive refractive power/negative refractive power/positive refractive power/negative refractive power sequentially from an object side.

The optical system configured as described above may improve optical performance through aberration improvement. In addition, the optical system configured as described above may improve sensitivity of the lenses by decreasing a refraction angle. Therefore, in the optical system according to an exemplary embodiment of the present disclosure, all of the five lenses may be formed of plastic.

The optical system according to an exemplary embodiment of the present disclosure may satisfy Conditional Expression 1.

$T34/T23>8.0$  [Conditional Expression 1]

Here, T23 is a distance (air gap) [mm] between the second and third lenses, and T34 is a distance (air gap) [mm] between the third and fourth lenses.

Here, when T34/T23 is out of a lower limit value of Conditional Expression 1, the air gap between the second and third lenses may become large, such that it is difficult to secure resolution of a peripheral portion of each lens, or an overall optical system may become long, such that it is difficult to miniaturize the optical system.

The optical system according to an exemplary embodiment of the present disclosure may satisfy Conditional Expression 2.

$$f1/f<-1.0 \quad \text{[Conditional Expression 2]}$$

Here, f1 is a focal length [mm] of the first lens, and f is an overall focal length [mm] of the optical system.

Here, when f1/f is out of an upper limit value of Conditional Expression 2, the negative refractive power of the first lens may become strong, such that it is difficult to secure the resolution of the peripheral portion of each lens, or the overall optical system may become long, such that it is difficult to miniaturize the optical system.

The optical system according to an exemplary embodiment of the present disclosure may satisfy Conditional Expression 3.

$$f12/f<1.0 \quad \text{[Conditional Expression 3]}$$

Here, f12 is a synthetic focal length [mm] of the first and second lenses, and f is the overall focal length [mm] of the optical system.

Here, when f12/f is out of an upper limit value of Conditional Expression 3, the positive refractive power of the second lens may become weak, such that it is difficult to secure the resolution of the peripheral portion of each lens, or the overall optical system may become long, such that it is difficult to miniaturize the optical system.

The optical system according to an exemplary embodiment of the present disclosure may satisfy Conditional Expression 4.

$$20<v2-v3<70 \quad \text{[Conditional Expression 4]}$$

Here, v2 is an Abbe number of the second lens, and v3 is an Abbe number of the third lens.

Here, in the case in which v2−v3 is out of a lower limit value of Conditional Expression 4, it may be difficult to correct chromatic aberration, such that it is difficult to implement high resolution, and in the case in which v2−v3 is out of an upper limit value of Conditional Expression 4, it may be difficult to decrease a manufacturing cost of the optical system.

The optical system according to an exemplary embodiment of the present disclosure may satisfy Conditional Expression 5.

$$-3.0<f3/f2<-0.3 \quad \text{[Conditional Expression 5]}$$

Here, f2 is a focal length [mm] of the second lens, and f3 is a focal length [mm] of the third lens.

Here, in the case in which f3/f2 is out of a lower limit value or an upper limit value of Conditional Expression 5, refractive power of the second or third lens may become strong and a curvature thereof may become small, such that it is difficult to manufacture a shape of the lens.

The optical system according to an exemplary embodiment of the present disclosure may satisfy Conditional Expression 6.

$$0.5<OAL/f<2.0 \quad \text{[Conditional Expression 6]}$$

Here, OAL is a distance [mm] from an object-side surface of the first lens to an image surface, and f is the overall focal length [mm] of the optical system.

Here, in the case in which OAL/f is out of a lower limit value of Conditional Expression 6, a viewing angle of the optical system may become small, and in the case in which OAL/f is out of an upper limit value of Conditional Expression 6, the overall optical system may become long, such that it is difficult to miniaturize the optical system.

The optical system according to an exemplary embodiment of the present disclosure may satisfy Conditional Expression 7.

$$v3<40 \quad \text{[Conditional Expression 7]}$$

Here, v3 is the Abbe number of the third lens.

Here, in the case in which v3 is out of an upper limit value of Conditional Expression 7, it may be difficult to correct the chromatic aberration, such that it is difficult to implement high resolution.

The optical system according to an exemplary embodiment of the present disclosure may satisfy Conditional Expression 8.

$$-5.0<f4/f1<0 \quad \text{[Conditional Expression 8]}$$

Here, f1 is the focal length [mm] of the first lens, and f4 is a focal length [mm] of the fourth lens.

Here, in the case in which f4/f1 is out of a lower limit value of Conditional Expression 8, the negative refractive power of the first lens may become strong, such that it is difficult to secure the resolution of the peripheral portion of each lens, and in the case in which f4/f1 is out of an upper limit value of Conditional Expression 8, the fourth lens may have negative refractive power or the first lens may have positive refractive power, such that overall refractive power is changed.

The optical system according to an exemplary embodiment of the present disclosure may satisfy Conditional Expression 9.

$$1.60<n3<2.10 \quad \text{[Conditional Expression 9]}$$

Here, n3 is a refractive index of the third lens.

Here, in the case in which n3 is out of a lower limit value of Conditional Expression 9, it may be difficult to correct chromatic aberration, such that it is difficult to implement high resolution, and in the case in which n3 is out of an upper limit value of Conditional Expression 9, it may be difficult to decrease a manufacturing cost of the optical system.

Next, the first to fifth lenses 10 to 50 configuring the optical system according to an exemplary embodiment of the present disclosure will be described.

The first lens 10 may have negative refractive power. In addition, the first lens 10 may have a meniscus shape in which it is convex toward an object. In detail, first and second surfaces of the first lens 10 may be convex toward the object.

At least one of the first and second surfaces of the first lens 10 may be aspherical. For example, both surfaces of the first lens may be aspherical.

The second lens 20 may have positive refractive power. In addition, a first surface of the second lens 20 may be convex toward the object, and a second surface thereof may be concave toward the object or be convex toward the object. In detail, the second lens 20 may have a meniscus shape in which both surfaces thereof are convex or are convex toward the object.

At least one of the first and second surfaces of the second lens 20 may be aspherical. For example, both surfaces of the second lens 20 may be aspherical.

Meanwhile, the first and second lenses 10 and 20 may overall have positive refractive power.

The third lens 30 may have negative refractive power. In addition, both surfaces of the third lens 30 may be concave. In detail, a first surface of the third lens 30 may be concave toward the object, and a second surface thereof may be concave toward the image.

Unlike this, the third lens 30 may have a meniscus shape in which it is convex toward an object. In detail, the first and second surfaces of the third lens 30 may be convex toward the object.

At least one of the first and second surfaces of the third lens 30 may be aspherical. For example, both surfaces of the third lens 30 may be aspherical.

The fourth lens 40 may have positive refractive power. In addition, the fourth lens 40 may have a meniscus shape in which it is convex toward the image. In detail, a first surface of the fourth lens 40 may be concave toward the object, and a second surface thereof may be convex toward the image.

At least one of the first and second surfaces of the fourth lens 40 may be aspherical. For example, both surfaces of the fourth lens 40 may be aspherical.

The fifth lens 50 may have negative refractive power. In addition, both surfaces of the firth lens 50 may be concave. In detail, a first surface of the fifth lens 50 may be concave toward the object, and a second surface thereof may be concave toward the image.

In addition, the fifth lens 50 may have an inflection point formed on at least any one of the first and second surfaces thereof. For example, the second surface of the fifth lens 50 may be concave at the center of an optical axis and become convex toward an edge thereof.

In addition, at least one of the first and second surfaces of the fifth lens 50 may be aspherical. For example, both surfaces of the fifth lens 50 may be aspherical.

In the optical system configured as described above, a plurality of lenses perform an aberration correction function, whereby aberration improvement performance may be improved. In addition, in the optical system, a refraction angle of the lens is decreased, whereby sensitivity of the lenses may be improved. Therefore, in the optical system, all of the lenses may be formed of plastic having optical performance lower than that of glass, whereby a manufacturing cost of a lens module may be decreased and manufacturing efficiency thereof may be increased.

Figure 1:
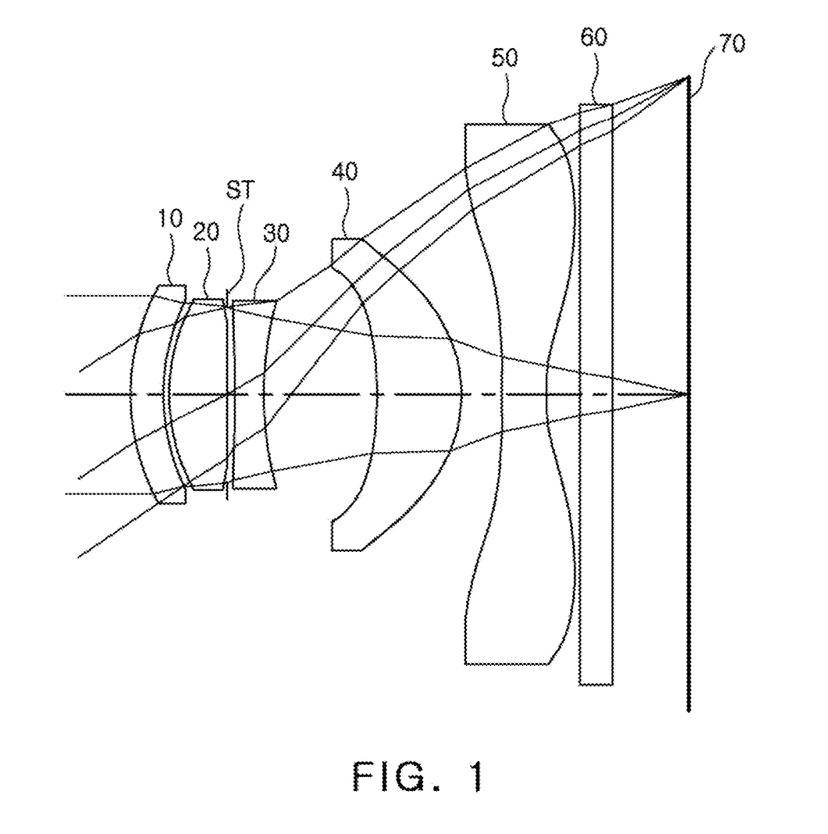
FIG. 1 is a configuration diagram of an optical system according to a first exemplary embodiment of the present disclosure.

An optical system according to a first exemplary embodiment of the present disclosure will be described with reference to FIGS. 1 and 2.

An optical system according to a first exemplary embodiment of the present disclosure may include a first lens 10, a second lens 20, a third lens 30, a fourth lens 40, and a fifth lens 50, and may further include an infrared cut-off filter 60, an image sensor 70, and a stop ST.

Here, as shown in Table 1, a distance (OAL) from an object-side surface of the first lens 10 to a first surface (image surface) of the image sensor 70 may be 5.15 mm, and a distance (BFL) from an image-side surface of the fifth lens 50 to the image surface may be 1.313 mm. In addition, a focal length f1 of the first lens 10 may be −16.534 mm, a focal length f2 of the second lens 20 may be 2.486 mm, a focal length f3 of the third lens 30 may be −6.209 mm, a focal length f4 of the fourth lens 40 may be 2.661 mm, a focal length f5 of the fifth lens 50 may be −2.344 mm, a synthetic focal length f12 of the first and second lenses 10 and 20 may be 3.111 mm, and an overall focal length f of the optical system may be 4.238 mm.

TABLE 1

| | |
|---|---|
| f1 | −16.534 |
| f2 | 2.486 |
| f3 | −6.209 |
| f4 | 2.661 |
| f5 | −2.344 |
| f12 | 3.111 |
| f | 4.238 |
| BFL | 1.313 |
| FNO | 2.3 |
| OAL | 5.150 |
| FOV | 68.5 |

Other characteristics of lenses (radii of curvature of lenses, thicknesses of lenses, distances between lenses, refractive indices of lenses, Abbe numbers of lenses) are shown in Table 2.

TABLE 2

| Surface No. | Radius of Curvature | Thickness or Distance | Refractive Index | Abbe Number |
|---|---|---|---|---|
| 1 | 2.001 | 0.30 | 1.544 | 56.1 |
| 2 | 1.550 | 0.05 | | |
| 3 | 1.385 | 0.54 | 1.544 | 56.1 |
| 4 | −62.800 | 0.00 | | |
| Stop | Infinity | 0.06 | | |
| 6 | −12.683 | 0.27 | 1.635 | 24 |
| 7 | 5.850 | 1.05 | | |
| 8 | −3.555 | 0.77 | 1.544 | 56.1 |
| 9 | −1.111 | 0.39 | | |
| 10 | −11.363 | 0.40 | 1.544 | 56.1 |
| 11 | 1.46167 | 0.31 | | |
| 12 | Infinity | 0.30 | 1.517 | 64.2 |
| 13 | Infinity | 0.70 | | |
| Image | Infinity | | | |

In a first exemplary embodiment of the present disclosure, the first lens 10 may have negative refractive power and may have a meniscus shape in which it is convex toward an object. The second lens 20 may have positive refractive power, and both surfaces thereof may be convex. The third lens 30 may have negative refractive power, and both surfaces thereof may be concave. The fourth lens 40 may have positive refractive power and may have a meniscus shape in which it is convex toward an image. The fifth lens 50 may have negative refractive power, and both surfaces thereof may be concave. In addition, the fifth lens 50 may have an inflection point formed on at least any one of first and second surfaces thereof. Further, the stop ST may be disposed between the second lens 20 and the third lens 30.

The stop ST may be disposed between the second lens 20 and the third lens 30, thereby decreasing sensitivity of each lens to a decentered tolerance.

Meanwhile, the respective surfaces of the first to fifth lenses 10 to 50 may have aspherical coefficients as shown in Table 3. That is, all of the first surface of the first lens 10 to the second surface of the fifth lens 50 may be aspherical.

TABLE 3

| surface# | 1 | 2 | 3 | 4 | 6 | 7 | 8 | 9 | 10 | 11 |
|---|---|---|---|---|---|---|---|---|---|---|
| Conic Constant (K) | −0.870402 | −6.750919 | −4.443183 | 0 | 0 | −4.706606 | 4.197184 | −0.51196 | 0 | −7.40486 |
| 4th Order Coefficient (A) | −0.035407 | −0.078259 | −0.042446 | 0.0210553 | 0.0934843 | 0.1047722 | −0.05778 | 0.143353 | −0.05894 | −0.0526 |
| 6th Order Coefficient (B) | 0.0653051 | 0.0888674 | 0.0497927 | −0.177217 | −0.200423 | −0.0734 | 0.023796 | −0.10908 | 0.021844 | 0.016863 |
| 8th Order Coefficient (C) | −0.095628 | 0.0334932 | 0.0345238 | −0.037944 | 0.0781283 | 0.1031949 | −0.06056 | 0.083622 | −0.00268 | −0.00382 |
| 10th Order Coefficient (D) | 0.1153479 | 0.0398428 | 0.0043924 | 0.3308742 | 0.2080983 | −0.072032 | 0.031074 | −0.04163 | 7.68E−05 | 0.000469 |
| 12th Order Coefficient (E) | −0.045425 | 0 | 0 | −0.208267 | −0.157165 | 0.0385763 | −0.00819 | 0.01005 | 0 | −2.47E−05 |

Meanwhile, it may be appreciated from Table 4 that the optical system according to a first exemplary embodiment of the present disclosure satisfies Conditional Expressions 1 to 9 described above. Therefore, optical performance of the lens may be improved.

Figure 2:
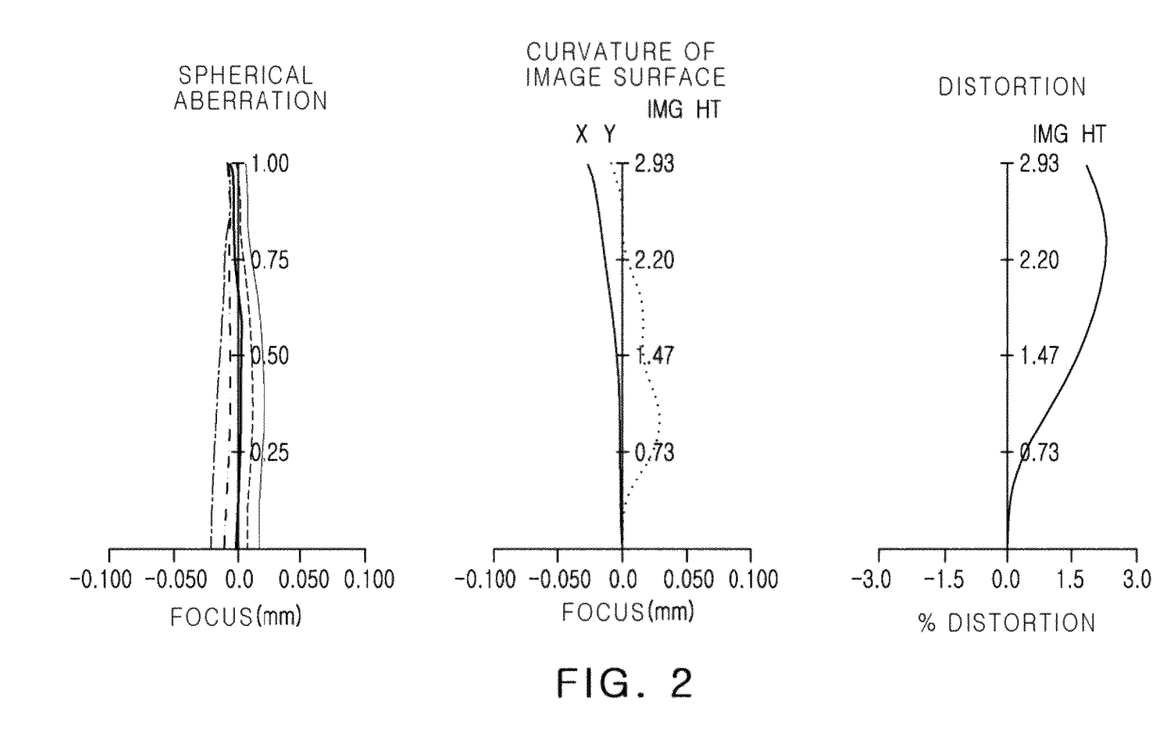
FIG. 2 is a curve showing aberration characteristics of the optical system shown in FIG. 1.

In addition, the optical system configured as described above may have aberration characteristics shown in FIG. 2.

TABLE 4

| CONDITIONAL EXPRESSION 1 | 16.094612 | T34/T23 |
| CONDITIONAL EXPRESSION 2 | −3.901481 | f1/f |
| CONDITIONAL EXPRESSION 3 | 0.7340727 | f12/f |
| CONDITIONAL EXPRESSION 4 | 32.1 | v2−v3 |
| CONDITIONAL EXPRESSION 5 | −2.497168 | f3/f2 |
| CONDITIONAL EXPRESSION 6 | 1.2151708 | OAL/f |
| CONDITIONAL EXPRESSION 7 | 24 | v3 |
| CONDITIONAL EXPRESSION 8 | −0.160909 | f4/f1 |
| CONDITIONAL EXPRESSION 9 | 1.635 | n3 |

Figure 3:
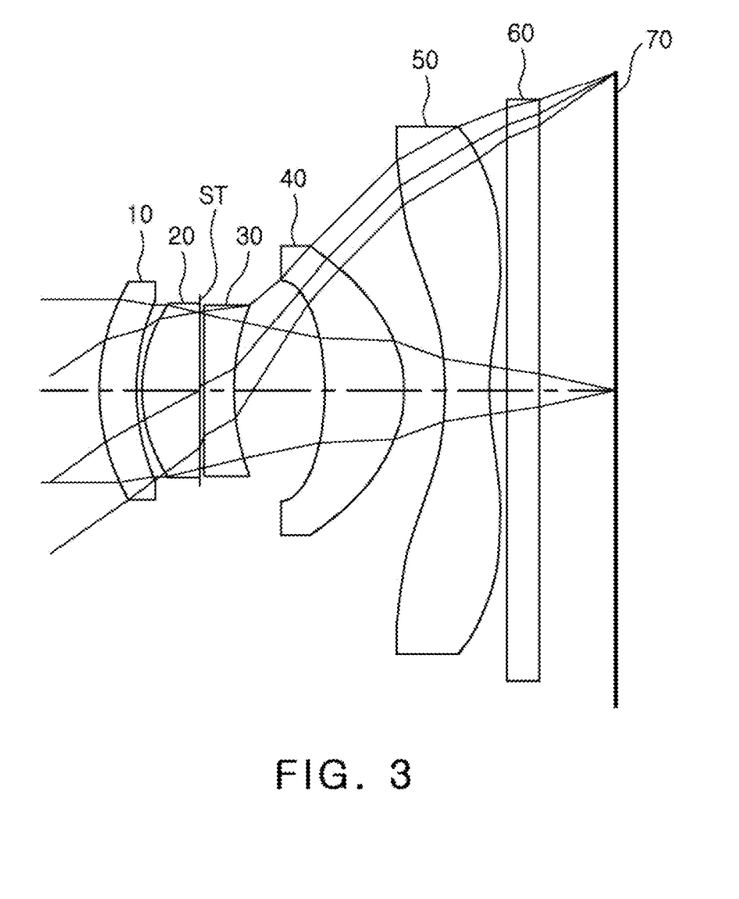
FIG. 3 is a configuration diagram of an optical system according to a second exemplary embodiment of the present disclosure.

An optical system according to a second exemplary embodiment of the present disclosure will be described with reference to FIGS. 3 and 4.

An optical system according to a second exemplary embodiment of the present disclosure may include a first lens 10, a second lens 20, a third lens 30, a fourth lens 40, and a fifth lens 50, and may further include an infrared cut-off filter 60, an image sensor 70, and a stop ST.

Here, as shown in Table 5, a distance (OAL) from an object-side surface of the first lens 10 to an image surface of the image sensor 70 may be 4.749 mm, and a distance (BFL) from an image-side surface of the fifth lens 50 to the image surface may be 1.159 mm. In addition, a focal length f1 of the first lens 10 may be −12.265 mm, a focal length f2 of the second lens 20 may be 2.175 mm, a focal length f3 of the third lens 30 may be −5.952 mm, a focal length f4 of the fourth lens 40 may be 2.624 mm, a focal length f5 of the fifth lens 50 may be −2.178 mm, a synthetic focal length f12 of the first and second lenses 10 and 20 may be 2.873 mm, and an overall focal length f of the optical system may be 4.1 mm.

TABLE 5

| f1 | −12.265 |
| f2 | 2.175 |
| f3 | −5.952 |
| f4 | 2.624 |
| f5 | −2.178 |

TABLE 5-continued

| f12 | 2.873 |
| f | 4.1 |
| BFL | 1.159 |
| FNO | 2.4 |
| OAL | 4.749 |
| FOV | 70.2 |

Other characteristics of lenses (radii of curvature of lenses, thicknesses of lenses, distances between lenses, refractive indices of lenses, Abbe numbers of lenses) are shown in Table 6.

TABLE 6

| Surface No. | Radius of Curvature | Thickness or Distance | Refractive Index | Abbe Number |
|---|---|---|---|---|
| 1 | 1.855 | 0.35 | 1.544 | 56.1 |
| 2 | 1.356 | 0.05 | | |
| 3 | 1.090 | 0.52 | 1.544 | 56.1 |
| 4 | 10.831 | 0.00 | | |
| Stop | Infinity | 0.05 | | |
| 6 | −98.515 | 0.27 | 1.635 | 24 |
| 7 | 3.974 | 0.83 | | |
| 8 | −3.006 | 0.73 | 1.544 | 56.1 |
| 9 | −1.054 | 0.38 | | |
| 10 | −2.583 | 0.40 | 1.544 | 56.1 |
| 11 | 2.32924 | 0.16 | | |
| 12 | Infinity | 0.30 | 1.517 | 64.2 |
| 13 | Infinity | 0.70 | | |
| Image | Infinity | | | |

In a second exemplary embodiment of the present disclosure, the first lens 10 may have negative refractive power and may have a meniscus shape in which it is convex toward an object. The second lens 20 may have positive refractive power and may have a meniscus shape in which it is convex toward the object. The third lens 30 may have negative refractive power, and both surfaces thereof may be concave. The fourth lens 40 may have positive refractive power and may have a meniscus shape in which it is convex toward an image. The fifth lens 50 may have negative refractive power, and both surfaces thereof may be concave. In addition, the fifth lens 50 may have an inflection point formed on at least any one of first and second surfaces thereof. Further, the stop ST may be disposed between the second lens 20 and the third lens 30.

The stop ST may be disposed between the second lens 20 and the third lens 30, thereby decreasing sensitivity of each lens to a decentered tolerance.

Meanwhile, the respective surfaces of the first to fifth lenses 10 to 50 may have aspherical coefficients as shown in Table 7. That is, all of the first surface of the first lens 10 to the second surface of the fifth lens 50 may be aspherical.

TABLE 7

| surface# | 1 | 2 | 3 | 4 | 6 | 7 | 8 | 9 | 10 | 11 |
|---|---|---|---|---|---|---|---|---|---|---|
| Conic Constant (K) | −1.398072 | −11.76191 | −6.64088 | 0 | 0 | −0.662077 | 6.624837 | −0.45719 | 0 | −19.1949 |
| 4th Order Coefficient (A) | −0.042304 | −0.098691 | 0.0492035 | 0.0133654 | 0.0813346 | 0.121106 | −0.07415 | 0.131568 | −0.01382 | −0.06109 |
| 6th Order Coefficient (B) | 0.0982426 | 0.1863962 | 0.0216316 | −0.319996 | −0.270681 | −0.01851 | −0.00897 | −0.10955 | 0.026942 | 0.023822 |
| 8th Order Coefficient (C) | −0.136018 | −0.082599 | 0.0557973 | 0.1273475 | 0.1446676 | 0.0238441 | −0.02983 | 0.106375 | −0.00512 | −0.00694 |
| 10th Order Coefficient (D) | 0.1334919 | 0.1008262 | 0.0261717 | 0.5288883 | 0.3942123 | 0.0264427 | 0.002265 | −0.06808 | 3.22E−04 | 0.001079 |
| 12th Order Coefficient (E) | −0.042489 | 0 | 0 | −0.493 | −0.431801 | 0.0081013 | −0.00358 | 0.022302 | 0 | −6.69E−05 |

Meanwhile, it may be appreciated from Table 8 that the optical system according to a second exemplary embodiment of the present disclosure satisfies Conditional Expressions 1 to 9 described above. Therefore, optical performance of the lens may be improved.

Figure 4:
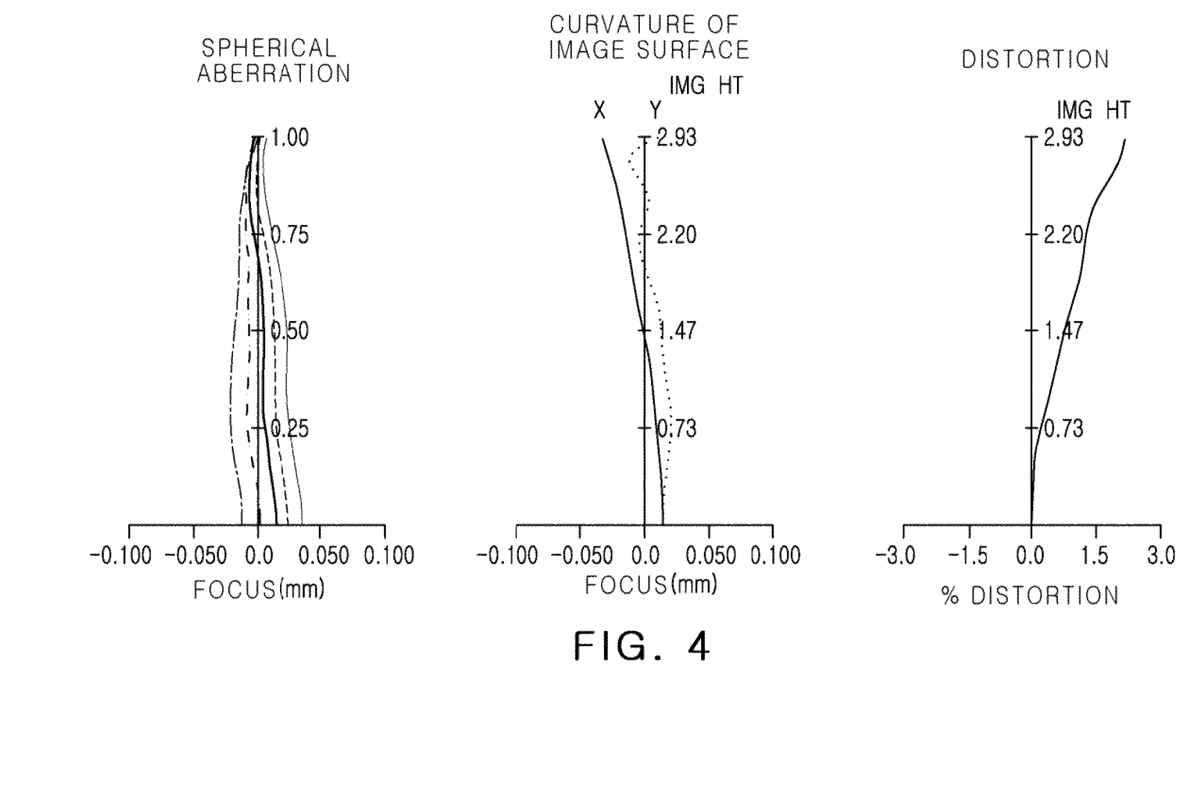
FIG. 4 is a curve showing aberration characteristics of the optical system shown in FIG. 3.

In addition, the optical system configured as described above may have aberration characteristics shown in FIG. 4.

TABLE 8

| CONDITIONAL EXPRESSION 1 | 16.698029 | T34/T23 |
| CONDITIONAL EXPRESSION 2 | −2.991356 | f1/f |
| CONDITIONAL EXPRESSION 3 | 0.7007317 | f12/f |
| CONDITIONAL EXPRESSION 4 | 32.1 | v2-v3 |
| CONDITIONAL EXPRESSION 5 | −2.736108 | f3/f2 |
| CONDITIONAL EXPRESSION 6 | 1.1583502 | OAL/f |
| CONDITIONAL EXPRESSION 7 | 24 | v3 |
| CONDITIONAL EXPRESSION 8 | −0.213954 | f4/f1 |
| CONDITIONAL EXPRESSION 9 | 1.635 | n3 |

Figure 5:
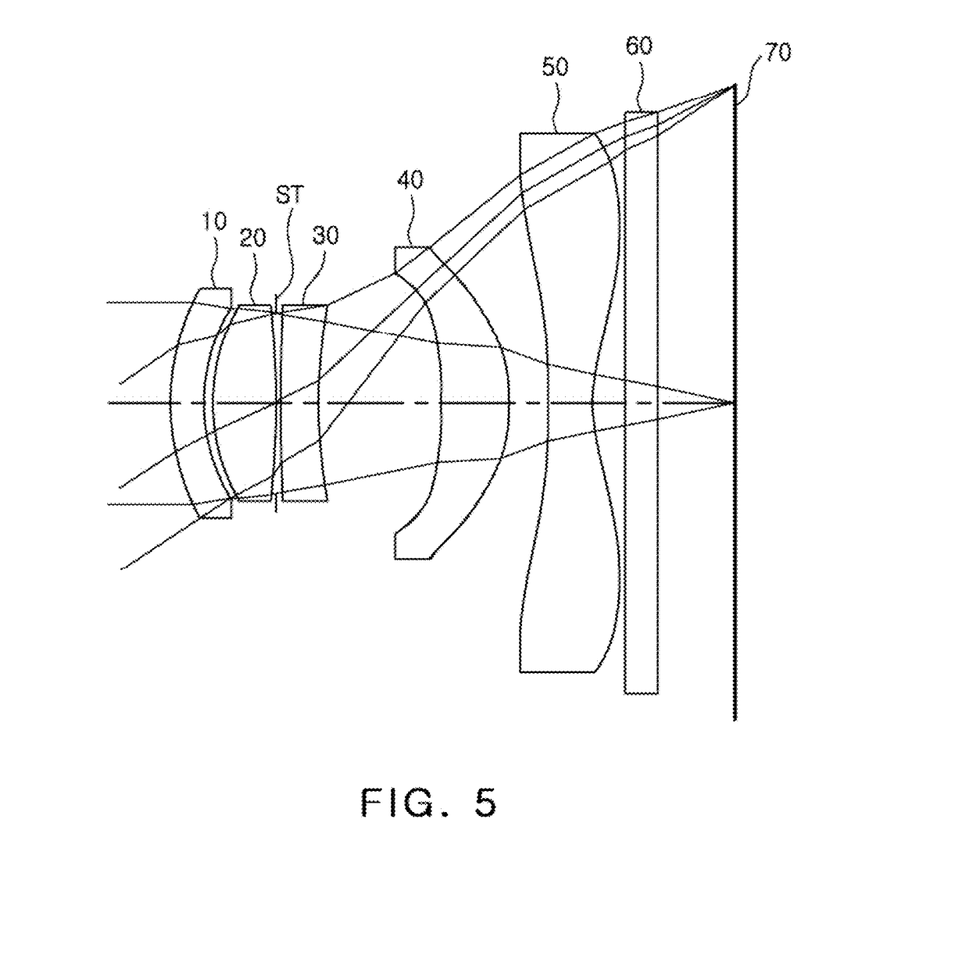
FIG. 5 is a configuration diagram of an optical system according to a third exemplary embodiment of the present disclosure.

An optical system according to a third exemplary embodiment of the present disclosure will be described with reference to FIGS. 5 and 6.

An optical system according to a third exemplary embodiment of the present disclosure may include a first lens 10, a second lens 20, a third lens 30, a fourth lens 40, and a fifth lens 50, and may further include an infrared cut-off filter 60, an image sensor 70, and a stop ST.

Here, as shown in Table 9, a distance (OAL) from an object-side surface of the first lens 10 to an image surface of the image sensor 70 may be 5.150 mm, and a distance (BFL) from an image-side surface of the fifth lens 50 to the image surface may be 1.307 mm. In addition, a focal length f1 of the first lens 10 may be −7.627 mm, a focal length f2 of the second lens 20 may be 2.401 mm, a focal length f3 of the third lens 30 may be −11.645 mm, a focal length f4 of the fourth lens 40 may be 2.755 mm, a focal length f5 of the fifth lens 50 may be −2.292 mm, a synthetic focal length f12 of the first and second lenses 10 and 20 may be 3.758 mm, and an overall focal length f of the optical system may be 4.23 mm.

TABLE 9

| f1 | −7.627 |
| f2 | 2.401 |
| f3 | −11.645 |
| f4 | 2.755 |
| f5 | −2.292 |

TABLE 9-continued

| f12 | 3.758 |
| f | 4.23 |
| BFL | 1.307 |
| FNO | 2.25 |
| OAL | 5.150 |
| FOV | 68 |

Other characteristics of lenses (radii of curvature of lenses, thicknesses of lenses, distances between lenses, refractive indices of lenses, Abbe numbers of lenses) are shown in Table 10.

TABLE 10

| Surface No. | Radius of Curvature | Thickness or Distance | Refractive Index | Abbe Number |
|---|---|---|---|---|
| 1 | 2.021 | 0.30 | 1.635 | 24 |
| 2 | 1.347 | 0.07 | | |
| 3 | 1.371 | 0.58 | 1.544 | 56.1 |
| 4 | −26.020 | 0.00 | | |
| Stop | Infinity | 0.05 | | |
| 6 | 10.713 | 0.33 | 1.635 | 24 |
| 7 | 4.346 | 1.13 | | |
| 8 | −4.585 | 0.63 | 1.544 | 56.1 |
| 9 | −1.189 | 0.34 | | |
| 10 | −10.313 | 0.40 | 1.544 | 56.1 |
| 11 | 1.44523 | 0.31 | | |
| 12 | Infinity | 0.30 | 1.517 | 64.2 |
| 13 | Infinity | 0.70 | | |
| Image | Infinity | | | |

In a third exemplary embodiment of the present disclosure, the first lens 10 may have negative refractive power and may have a meniscus shape in which it is convex toward an object. The second lens 20 may have positive refractive power, and both surfaces thereof may be convex. The third lens 30 may have negative refractive power and may have a meniscus shape in which it is convex toward the object. The fourth lens 40 may have positive refractive power and may have a meniscus shape in which it is convex toward an image. The fifth lens 50 may have negative refractive power, and both surfaces thereof may be concave. In addition, the fifth lens 50 may have an inflection point formed on at least any one of first and second surfaces thereof. Further, the stop ST may be disposed between the second lens 20 and the third lens 30.

The stop ST may be disposed between the second lens 20 and the third lens 30, thereby decreasing sensitivity of each lens to a decentered tolerance.

Figure 7:
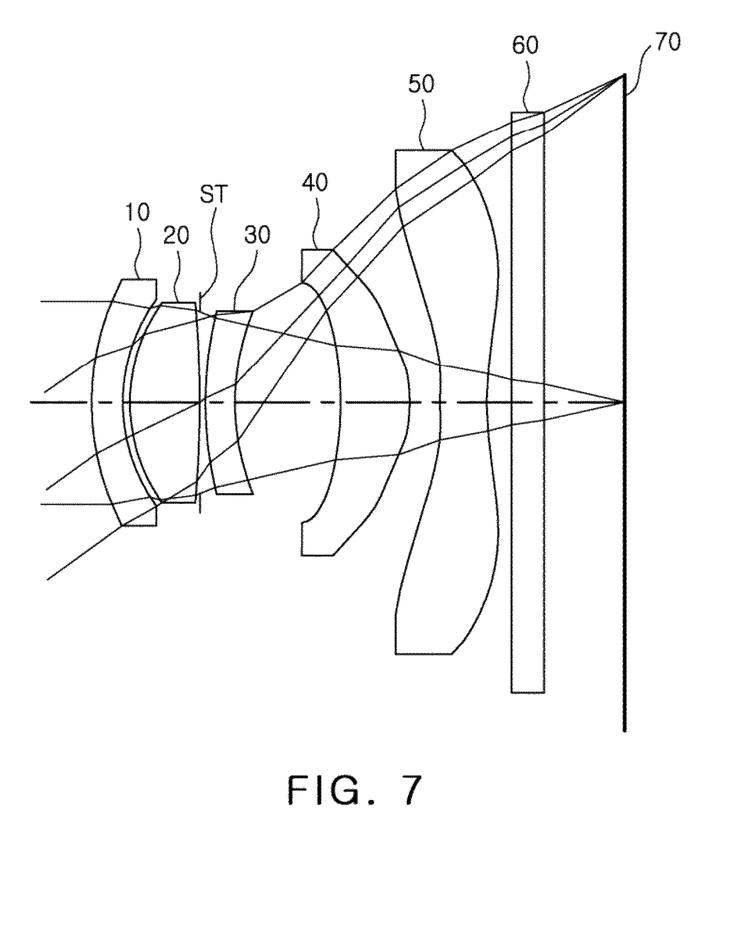
FIG. 7 is a configuration diagram of an optical system according to a fourth exemplary embodiment of the present disclosure.

Meanwhile, the respective surfaces of the first to fifth lenses 10 to 50 may have aspherical coefficients as shown in Table 11. That is, all of the first surface of the first lens 10 to the second surface of the fifth lens 50 may be aspherical.

may be −12.724 mm, a focal length f4 of the fourth lens 40 may be 2.694 mm, a focal length f5 of the fifth lens 50 may be −2.148 mm, a synthetic focal length f12 of the first and second lenses 10 and 20 may be 3.608 mm, and an overall focal length f of the optical system may be 4.1 mm.

TABLE 13

| | |
|---|---|
| f1 | −5.795 |
| f2 | 2.123 |
| f3 | −12.724 |
| f4 | 2.694 |

TABLE 11

| surface# | 1 | 2 | 3 | 4 | 6 | 7 | 8 | 9 | 10 | 11 |
|---|---|---|---|---|---|---|---|---|---|---|
| Conic Constant (K) | −2.095872 | −4.210807 | −3.22884 | 0 | 0 | −42.74787 | 10.92954 | −0.43242 | 0 | −7.52446 |
| 4th Order Coefficient (A) | −0.049503 | −0.026556 | 0.0016637 | 0.0496435 | 0.0190679 | 0.0500226 | −0.05786 | 0.168162 | −0.04267 | −0.05428 |
| 6th Order Coefficient (B) | 0.0787004 | 0.0640623 | 0.0362791 | −0.208475 | −0.190358 | −0.103116 | 0.038119 | −0.11434 | 0.018253 | 0.018465 |
| 8th Order Coefficient (C) | −0.080804 | −0.044393 | −0.058204 | −0.022953 | 0.0400128 | 0.1251464 | −0.08966 | 0.085232 | −0.00221 | −0.00463 |
| 10th Order Coefficient (D) | 0.0704193 | 0.07497 | 0.0422969 | 0.253262 | 0.2471989 | −0.073452 | 0.055705 | −0.04401 | 3.67E−05 | 0.000638 |
| 12th Order Coefficient (E) | −0.023473 | 0 | 0 | −0.139966 | −0.136586 | 0.0417762 | −0.0213 | 0.011163 | 0 | −3.70E−05 |

Meanwhile, it may be appreciated from Table 12 that the optical system according to a third exemplary embodiment of the present disclosure satisfies Conditional Expressions 1 to 9 described above. Therefore, optical performance of the lens may be improved.

Figure 6:
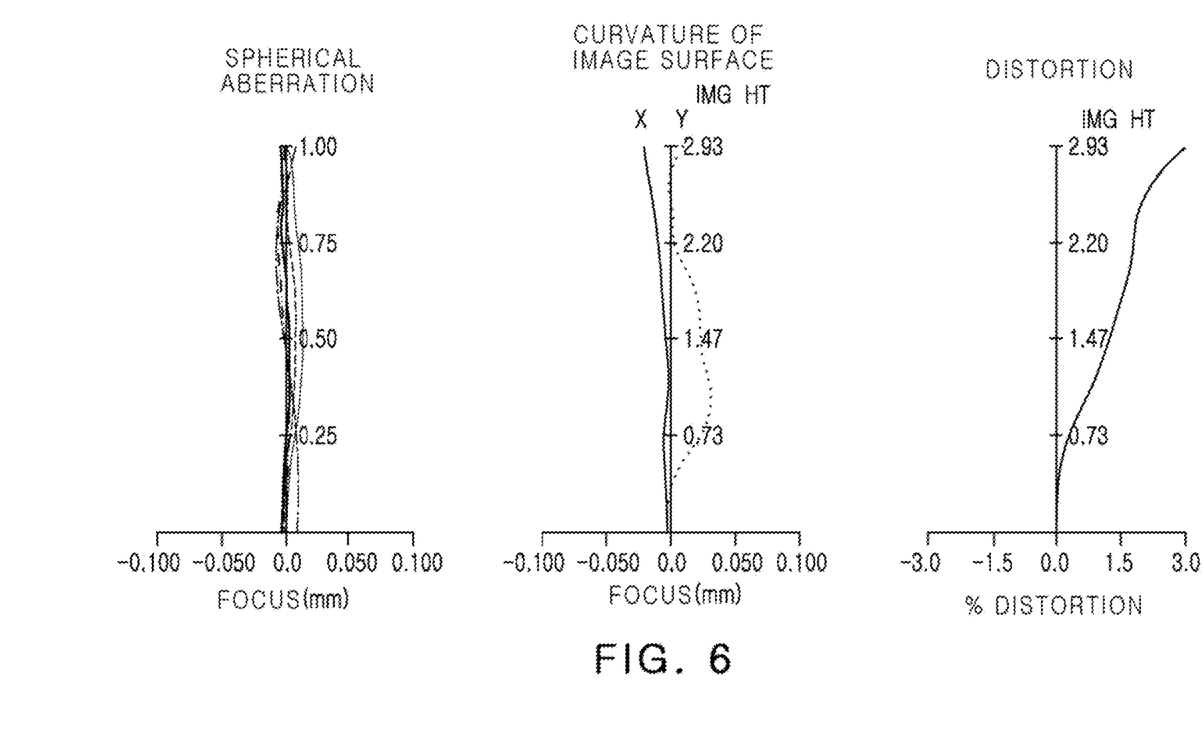
FIG. 6 is a curve showing aberration characteristics of the optical system shown in FIG. 5.

In addition, the optical system configured as described above may have aberration characteristics shown in FIG. 6.

TABLE 12

| CONDITIONAL EXPRESSION 1 | 22.676897 | T34/T23 |
|---|---|---|
| CONDITIONAL EXPRESSION 2 | −1.803052 | f1/f |
| CONDITIONAL EXPRESSION 3 | 0.8884161 | f12/f |
| CONDITIONAL EXPRESSION 4 | 32.1 | v2−v3 |
| CONDITIONAL EXPRESSION 5 | −4.849917 | f3/f2 |
| CONDITIONAL EXPRESSION 6 | 1.217469 | OAL/f |
| CONDITIONAL EXPRESSION 7 | 24 | v3 |
| CONDITIONAL EXPRESSION 8 | −0.36125 | f4/f1 |
| CONDITIONAL EXPRESSION 9 | 1.635 | n3 |

An optical system according to a fourth exemplary embodiment of the present disclosure will be described with reference to FIGS. 7 and 8.

An optical system according to a fourth exemplary embodiment of the present disclosure may include a first lens 10, a second lens 20, a third lens 30, a fourth lens 40, and a fifth lens 50, and may further include an infrared cut-off filter 60, an image sensor 70, and a stop ST.

Here, as shown in Table 13, a distance (OAL) from an object-side surface of the first lens 10 to an image surface of the image sensor 70 may be 4.770 mm, and a distance (BFL) from an image-side surface of the fifth lens 50 to the image surface may be 1.249 mm. In addition, a focal length f1 of the first lens 10 may be −5.795 mm, a focal length f2 of the second lens 20 may be 2.123 mm, a focal length f3 of the third lens 30

TABLE 13-continued

| | |
|---|---|
| f5 | −2.148 |
| f12 | 3.608 |
| f | 4.1 |
| BFL | 1.249 |
| FNO | 2.2 |
| OAL | 4.770 |
| FOV | 69.6 |

Other characteristics of lenses (radii of curvature of lenses, thicknesses of lenses, distances between lenses, refractive indices of lenses, Abbe numbers of lenses) are shown in Table 14.

TABLE 14

| Surface No. | Radius of Curvature | Thickness or Distance | Refractive Index | Abbe Number |
|---|---|---|---|---|
| 1 | 1.789 | 0.27 | 1.635 | 24 |
| 2 | 1.136 | 0.06 | | |
| 3 | 1.211 | 0.63 | 1.544 | 56.1 |
| 4 | −22.704 | 0.00 | | |
| Stop | Infinity | 0.05 | | |
| 6 | 2.689 | 0.27 | 1.635 | 24 |
| 7 | 1.943 | 0.95 | | |
| 8 | −4.789 | 0.61 | 1.544 | 56.1 |
| 9 | −1.177 | 0.28 | | |
| 10 | −3.256 | 0.40 | 1.544 | 56.1 |
| 11 | 1.91487 | 0.23 | | |
| 12 | Infinity | 0.30 | 1.517 | 64.2 |
| 13 | Infinity | 0.72 | | |
| Image | Infinity | | | |

In a fourth exemplary embodiment of the present disclosure, the first lens 10 may have negative refractive power and may have a meniscus shape in which it is convex toward an object. The second lens 20 may have positive refractive power, and both surfaces thereof may be convex. The third lens 30 may have negative refractive power and may have a meniscus shape in which it is convex toward the object. The fourth lens 40 may have positive refractive power and may have a meniscus shape in which it is convex toward an image. The fifth lens 50 may have negative refractive power, and both surfaces thereof may be concave. In addition, the fifth lens 50 may have an inflection point formed on at least any one of first and second surfaces thereof. Further, the stop ST may be disposed between the second lens 20 and the third lens 30.

The stop ST may be disposed between the second lens 20 and the third lens 30, thereby decreasing sensitivity of each lens to a decentered tolerance.

Meanwhile, the respective surfaces of the first to fifth lenses 10 to 50 may have aspherical coefficients as shown in Table 15. That is, all of the first surface of the first lens 10 to the second surface of the fifth lens 50 may be aspherical.

TABLE 15

| surface# | 1 | 2 | 3 | 4 | 6 | 7 | 8 | 9 | 10 | 11 |
|---|---|---|---|---|---|---|---|---|---|---|
| Conic Constant (K) | −3.66521 | −3.467763 | −2.55948 | 0 | 0 | −8.51905 | 16.6167 | −0.54706 | 0 | −15.2671 |
| 4th Order Coefficient (A) | −0.051284 | −0.03407 | 0.0153702 | 0.0461923 | −0.01622 | 0.0976116 | −0.05763 | 0.166092 | −0.05256 | −0.07943 |
| 6th Order Coefficient (B) | 0.0687451 | 0.0351119 | 0.0378575 | −0.162695 | −0.115379 | −0.113339 | 0.030638 | −0.13398 | 0.044848 | 0.033454 |
| 8th Order Coefficient (C) | −0.06829 | −0.037097 | −0.07812 | 0.049779 | 0.0015885 | 0.1202049 | −0.14917 | 0.098135 | −0.00929 | −0.01084 |
| 10th Order Coefficient (D) | 0.0535837 | 0.0672905 | 0.0493466 | 0.0519543 | 0.2336525 | −0.062109 | 0.155924 | −0.04502 | 5.87E−04 | 0.00188 |
| 12th Order Coefficient (E) | −0.016149 | 0 | 0 | −0.034547 | −0.119732 | 0.0968946 | −0.08249 | 0.009864 | 0 | −1.32E−04 |

Meanwhile, it may be appreciated from Table 16 that the optical system according to a fourth exemplary embodiment of the present disclosure satisfies Conditional Expressions 1 to 9 described above. Therefore, optical performance of the lens may be improved.

Figure 8:
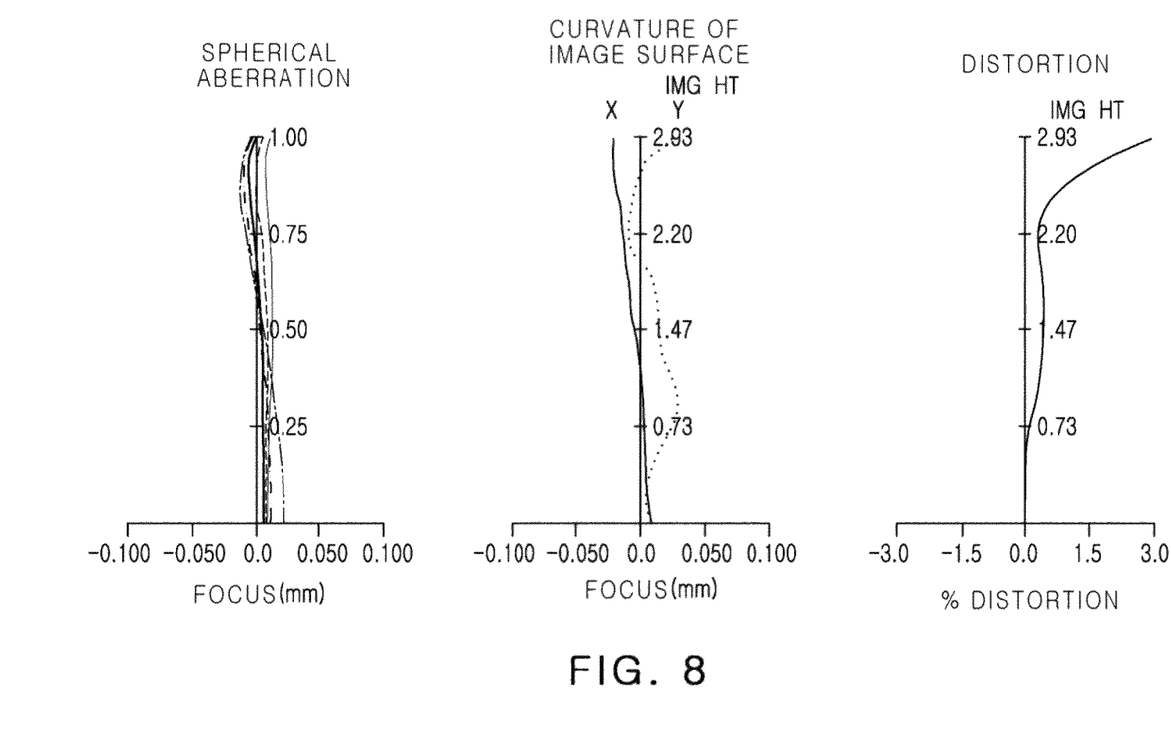
FIG. 8 is a curve showing aberration characteristics of the optical system shown in FIG. 7.

In addition, the optical system configured as described above may have aberration characteristics shown in FIG. 8.

TABLE 16

| CONDITIONAL EXPRESSION 1 | 19.022264 | T34/T23 |
| CONDITIONAL EXPRESSION 2 | −1.4135 | f1/f |
| CONDITIONAL EXPRESSION 3 | 0.88 | f12/f |
| CONDITIONAL EXPRESSION 4 | 32.1 | v2−v3 |
| CONDITIONAL EXPRESSION 5 | −5.992158 | f3/f2 |
| CONDITIONAL EXPRESSION 6 | 1.1634526 | OAL/f |
| CONDITIONAL EXPRESSION 7 | 24 | v3 |
| CONDITIONAL EXPRESSION 8 | −0.464863 | f4/f1 |
| CONDITIONAL EXPRESSION 9 | 1.635 | n3 |

As set forth above, according to exemplary embodiments of the present disclosure, an aberration improvement effect may be improved, high resolution may be implemented, and sensitivity of lenses may be improved.

While exemplary embodiments have been shown and described above, it will be apparent to those skilled in the art that modifications and variations could be made without departing from the spirit and scope of the present disclosure as defined by the appended claims.

What is claimed is:

1. An optical system comprising in order from an object side to an image side:
   a first lens having refractive power and having a meniscus shape of which an object-side surface is convex toward an object;
   a second lens having positive refractive power and having a meniscus shape in which it is convex toward the object;
   a third lens having negative refractive power;
   a fourth lens having positive refractive power; and
   a fifth lens having negative refractive power,
   wherein the optical system satisfies Conditional Expression 1:

$$T34/T23 > 8.0 \quad \text{[Conditional Expression 1]}$$

where T23 is a distance (air gap) [mm] between the second and third lenses, and T34 is a distance (air gap) [mm] between the third and fourth lenses, wherein there is a total of five lenses with refractive power.

2. The optical system of claim 1, wherein it satisfies Conditional Expression 2:

$$f1/f < -1.0 \quad \text{[Conditional Expression 2]}$$

where f1 is a focal length [mm] of the first lens, and f is an overall focal length [mm] of the optical system.

3. The optical system of claim 1, wherein it satisfies Conditional Expression 3:

$$f12/f < 1.0 \quad \text{[Conditional Expression 3]}$$

where f12 is a synthetic focal length [mm] of the first and second lenses, and f is an overall focal length [mm] of the optical system.

4. The optical system of claim 1, wherein it satisfies Conditional Expression 4:

$$20 < v2 - v3 < 70 \quad \text{[Conditional Expression 4]}$$

where v2 is an Abbe number of the second lens, and v3 is an Abbe number of the third lens.

5. The optical system of claim 1, wherein it satisfies Conditional Expression 5:

$$-3.0 < f3/f2 < -0.3 \quad \text{[Conditional Expression 5]}$$

where f2 is a focal length [mm] of the second lens, and f3 is a focal length [mm] of the third lens.

6. The optical system of claim 1, wherein it satisfies Conditional Expression 6:

$$0.5 < OAL/f < 2.0 \quad \text{[Conditional Expression 6]}$$

where OAL is a distance [mm] from an object-side surface of the first lens to an image surface, and f is an overall focal length [mm] of the optical system.

7. The optical system of claim 1, wherein it satisfies Conditional Expression 7:

$$v3<40 \quad \text{[Conditional Expression 7]}$$

where v3 is an Abbe number of the third lens.

8. The optical system of claim 1, wherein it satisfies Conditional Expression 8:

$$-5.0<f4/f1<0 \quad \text{[Conditional Expression 8]}$$

where f1 is a focal length [mm] of the first lens, and f4 is a focal length [mm] of the fourth lens.

9. The optical system of claim 1, wherein it satisfies Conditional Expression 9:

$$1.60<n3<2.10 \quad \text{[Conditional Expression 9]}$$

where n3 is a refractive index of the third lens.

10. The optical system of claim 1, wherein the first lens has negative refractive power.

11. The optical system of claim 1, wherein an image-side surface of the third lens is concave toward an image.

12. The optical system of claim 1, wherein both surfaces of the third lens are concave.

13. The optical system of claim 1, wherein the third lens has a meniscus shape in which it is convex toward the object.

14. The optical system of claim 1, wherein the fourth lens has a meniscus shape in which it is convex toward an image.

15. The optical system of claim 1, wherein both surfaces of the fifth lens are concave.

16. The optical system of claim 1, wherein the fifth lens has an inflection point formed on an object-side surface or an image-side surface thereof.

17. The optical system of claim 1, wherein the fifth lens has at least one inflection point formed on an image-side surface thereof.

18. The optical system of claim 1, wherein the first to fifth lenses are formed of plastic.

19. The optical system of claim 1, wherein at least one of an object-side surface and an image-side surface of each of the first to fifth lenses is aspherical.

20. An optical system comprising in order from an object side to an image side:
a first lens having negative refractive power, an object-side surface thereof being convex toward an object;
a second lens having positive refractive power;
a third lens having negative refractive power;
a fourth lens having positive refractive power; and
a fifth lens having negative refractive power, both surfaces thereof concave,
wherein the first and second lenses overall have positive refractive power, and the optical system satisfies Conditional Expression 1:

$$T34/T23>8.0 \quad \text{[Conditional Expression 1]}$$

where T23 is a distance (air gap) [mm] between the second and third lenses, and T34 is a distance (air gap) [mm] between the third and fourth lenses, wherein there is a total of five lenses with refractive power.

21. The optical system of claim 20, wherein it satisfies Conditional Expression 2:

$$f1/f<-1.0 \quad \text{[Conditional Expression 2]}$$

where f1 is a focal length [mm] of the first lens, and f is an overall focal length [mm] of the optical system.

22. The optical system of claim 20, wherein it satisfies Conditional Expression 3:

$$f12/f<1.0 \quad \text{[Conditional Expression 3]}$$

where f12 is a synthetic focal length [mm] of the first and second lenses, and f is an overall focal length [mm] of the optical system.

23. The optical system of claim 20, wherein it satisfies Conditional Expression 4:

$$20<v2-v3<70 \quad \text{[Conditional Expression 4]}$$

where v2 is an Abbe number of the second lens, and v3 is an Abbe number of the third lens.

24. The optical system of claim 20, wherein it satisfies Conditional Expression 5:

$$-3.0<f3/f2<-0.3 \quad \text{[Conditional Expression 5]}$$

where f2 is a focal length [mm] of the second lens, and f3 is a focal length [mm] of the third lens.

25. The optical system of claim 20, wherein it satisfies Conditional Expression 6:

$$0.5<OAL/f<2.0 \quad \text{[Conditional Expression 6]}$$

where OAL is a distance [mm] from an object-side surface of the first lens to an image surface, and f is an overall focal length [mm] of the optical system.

26. The optical system of claim 20, wherein it satisfies Conditional Expression 7:

$$v3<40 \quad \text{[Conditional Expression 7]}$$

where v3 is an Abbe number of the third lens.

27. The optical system of claim 20, wherein it satisfies Conditional Expression 8:

$$-5.0<f4/f1<0 \quad \text{[Conditional Expression 8]}$$

where f1 is a focal length [mm] of the first lens, and f4 is a focal length [mm] of the fourth lens.

28. The optical system of claim 20, wherein it satisfies Conditional Expression 9:

$$1.60<n3<2.10 \quad \text{[Conditional Expression 9]}$$

where n3 is a refractive index of the third lens.

* * * * *